Nov. 21, 1944.  M. H. WAGNER  2,363,212
STOCK FEEDER
Filed Oct. 27, 1943  2 Sheets-Sheet 1
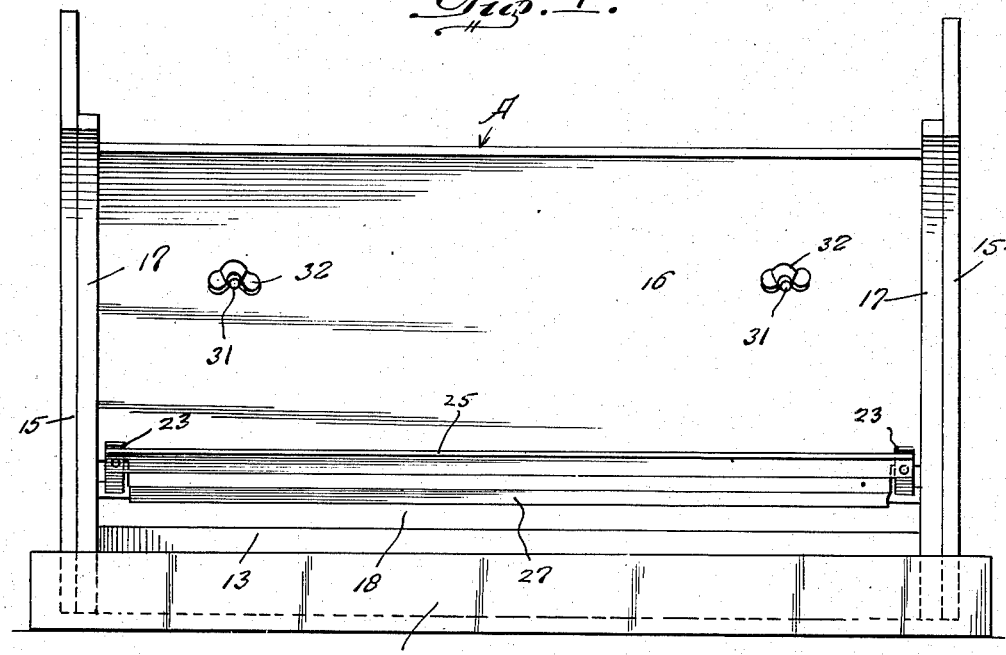
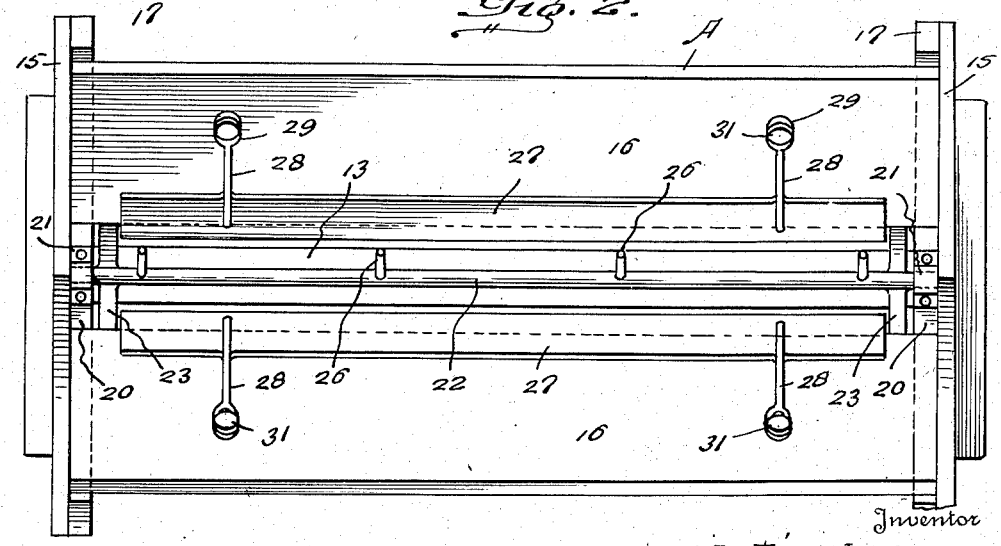
Inventor
Martin H. Wagner,
By
Attorney Nov. 21, 1944.  M. H. WAGNER  2,363,212
STOCK FEEDER
Filed Oct. 27, 1943  2 Sheets-Sheet 2
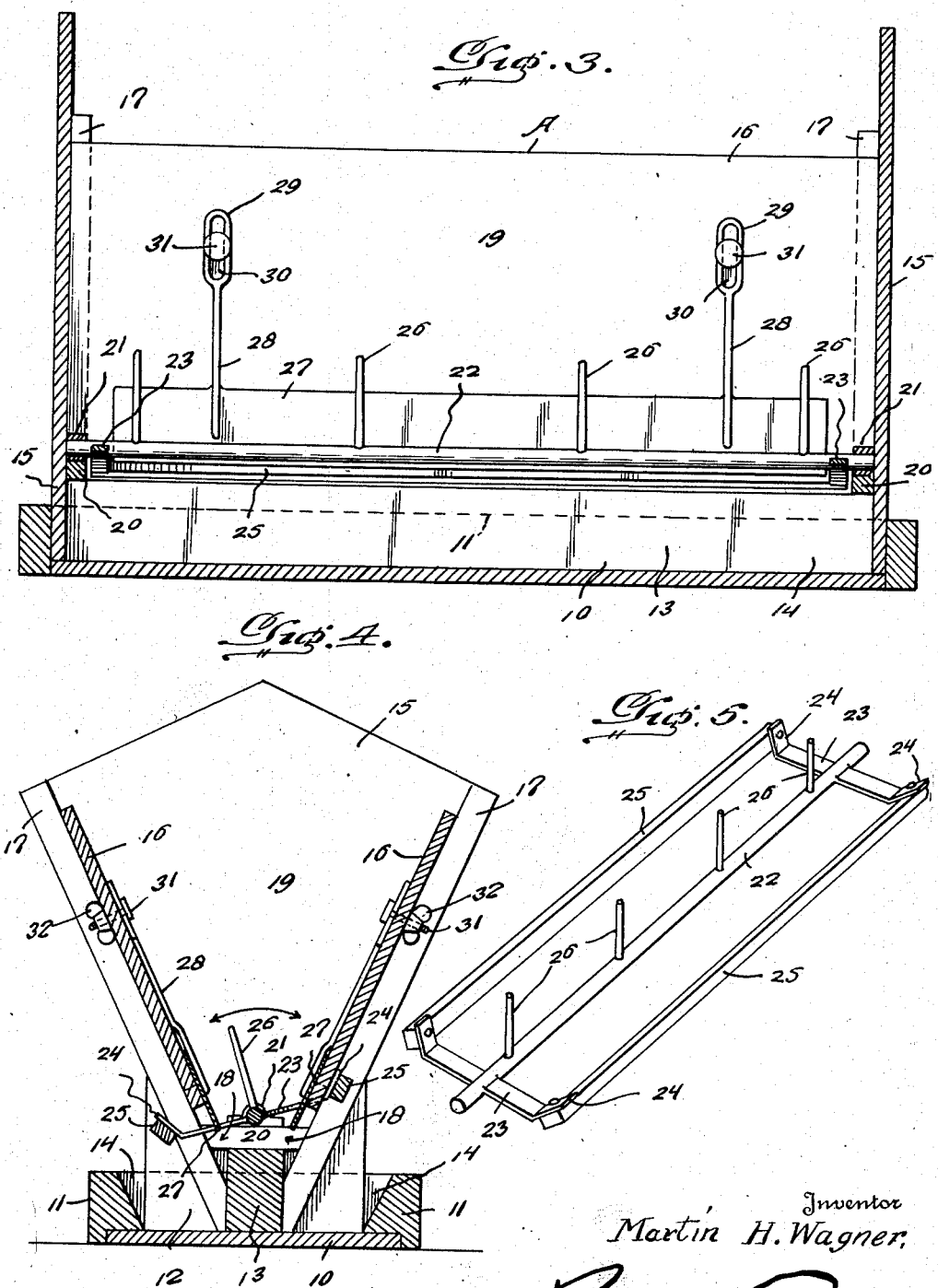
Inventor
Martin H. Wagner,
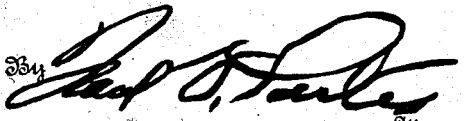
Attorney Patented Nov. 21, 1944

2,363,212

UNITED STATES PATENT OFFICE 2,363,212

STOCK FEEDER

Martin H. Wagner, Aplington, Iowa

Application October 27, 1943, Serial No. 507,835

1 Claim. (Cl. 119—53.5)

The invention relates to a stock feeder, and more especially to hog feeding troughs or stock feeders.

The primary object of the invention is the provision of a device of this character, wherein feed when placed therein will be constantly delivered to the stock, that is to say animals, particularly hogs, the latter when nosing the trough effect the operation of an agitator within the device, which prevents stoppage in the flow of the feed therein due to dampness or other weather conditions or sticky qualities of the feed.

Another object of the invention is the provision of a device of this character, wherein the agitator is operative from either side of the said device and is novel in construction and is unique in its arrangement, the feed being automatically fed to the animals, and the latter controls the working of the agitator so as to have the feed free flowing, and also to maintain the trough full while the animals are feeding therefrom.

A further object of the invention is the provision of a device of this character, wherein the flow of the feed can be regulated therein and the feeding of the animals can be obtained from both sides of the device during the use thereof.

A still further object of the invention is the provision of a device of this character, wherein the trough is of novel construction for the association of the agitator therewith and the supplying of feed to the device is had in a convenient manner.

A still further object of the invention is the provision of a device of this character, which is simple in construction, thoroughly reliable and efficient in operation, strong, durable, readily portable, involving an animal controlled agitator, and inexpensive to manufacture.

With these and other objects in view the invention consists in the features of construction, combination and arrangement of parts as will be hereinafter more fully described, illustrated in the accompanying drawings, which show the preferred form of embodiment of the invention, and pointed out in the claim hereunto appended.

In the accompanying drawings:

Figure 1 is a side elevation of the device constructed in accordance with the invention.

Figure 2 is a top plan view thereof.

Figure 3 is a central vertical longitudinal sectional view taken entirely through the device.

Figure 4 is a vertical cross sectional view taken approximately midway of the device.

Figure 5 is a perspective view of the agitator removed from the device.

Similar reference characters indicate corresponding parts throughout the several views in the drawings.

Referring to the drawings in detail A designates generally the feeder or device constructed in accordance with the invention and hereinafter set forth in detail.

The feeder or device A comprises a base forming a tray 10 having the walled sides and ends 11 and 12, respectively, which are of uniform height, this tray being of substantially rectangular shape or elongated, and rising from the longitudinal center of the tray is a dividing bar or partition 13 which extends vertically above the sides and ends 11 and 12, and divides the tray into parallel troughs 14 at opposite sides thereof for feeding purposes.

Built upon the base creating the tray 10 is a feed receiving and delivery hopper formed with the vertically disposed downwardly tapered ends 15 and sides 16, respectively. The ends 15 are cut into to saddle the bar or partition 13 at their lower ends and are united to the ends 12 of the base, while on the inner faces of the ends 15 following the major portion of the downwardly converging edges are reinforcing strips 17 to which are secured the sides 16, and these at their lower portions terminate removed from the bar or partition 13 to effect flow passages 18 communicating directly with the troughs 14, respectively. The hopper affords a food storage compartment 19 therein, and the feed contained therein gravitates into the said troughs 14 through the passages 18.

Arranged crosswise of the bar or partition 13 next to the saddling ends of the ends 15 are blocks 20 supporting bearings 21 in which is journaled the center turning axle 22 of an agitator having the crossing end pieces 23 which extend through opposite passages 18 for overhanging the troughs 14, and these pieces have the upwardly angled tips 24 to which are secured nosing bars 25, also overhanging the troughs, so that an animal through contact of its nose or head with the said bars 25 causes the rocking of the agitator in its bearings 21. This agitator axle 22 has projecting vertically at right angles thereto and at intervals thereof into the compartment 19 agitator tines or pins 26, so that when the axle turns these will loosen the feed within the compartment and thus assure free flow thereof from the said compartment into the troughs 14 during the feeding periods of the animals therefrom. These tines or pins 26 are disposed at substantially right angles to the lay of the pieces 23.

Slidably disposed on the inner faces of the sides 16 of the hopper are regulating gates 27 which are next to the passages 18 to regulate the extent of opening thereof and in this way control the flow of feed from the hopper into the troughs. The gates 27 are fitted with hanger arms 28 having the flattened longitudinally slotted upper ends 29, the slots being denoted at 30, through which pass winged nut carrying adjusting bolts 31 fitting the sides 16 of the hopper. The winged nuts 32 for these bolts 31 are located at the outer faces of the sides 16 for easy access. The gates 27 are substantially the extent of the passages 18 and can be easily adjusted at will.

As has been stated when an animal noses the troughs 14 for feeding purposes the agitator operates to loosen the feed within the hopper to assure free flow thereof into the troughs until the feed becomes exhausted therefrom. The bars 25 are of substantially the length of the extent of the troughs 14, so that there is no liability of the animal missing the said bars when nosing the troughs for food.

Any suitable cover (not shown) can be provided for the open top of the hopper and the base 10 is adapted to rest upon a floor or ground surface when the device is in use.

The axle 22 of the agitator is longitudinally centered in the hopper.

From the foregoing it is believed that the construction and manner of use of the device will be clearly understood, and therefore a more extended explanation has been omitted.

Changes, variations and modifications may be made in the device as fall properly within the scope of the claim hereunto appended, without departing from the spirit of the invention or sacrificing any of its advantages.

What is claimed is:

A feeder of the kind described, comprising a base having a center partition therein dividing it into opposed separated troughs, a hopper rising from the base and saddling the partition and having lower passages coextensive with the troughs for communication therewith, a turning shaft journaled horizontally in the hopper centrally above the partition and having a plurality of spaced upstanding tines forming agitator members within the hopper, and means extending from the shaft in overhanging relation to the troughs for nosing action by animals for the rocking of said shaft.

MARTIN H. WAGNER.